(12) United States Patent
Yasuda et al.

(10) Patent No.: US 7,547,368 B2
(45) Date of Patent: Jun. 16, 2009

(54) METHOD FOR WELDING PROCESSED ARTICLE AND WELDED PROCESSED PRODUCT

(75) Inventors: Mitsuo Yasuda, Nanto (JP); Yusuke Ishikuro, Nanto (JP); Ryoichi Katagishi, Nanto (JP)

(73) Assignee: Sanko Gosei Kabushiki Kaisha, Nanto-shi (JP)

( * ) Notice: Subject to any disclaimer, the term of this patent is extended or adjusted under 35 U.S.C. 154(b) by 399 days.

(21) Appl. No.: 11/524,777

(22) Filed: Sep. 21, 2006

(65) Prior Publication Data

US 2007/0057023 A1   Mar. 15, 2007

(51) Int. Cl.
*B32B 37/00* (2006.01)
(52) U.S. Cl. .................................... 156/73.5; 156/292
(58) Field of Classification Search ............... 156/73.1, 156/73.5, 292, 498, 580, 580.1, 580.2
See application file for complete search history.

(56) References Cited

U.S. PATENT DOCUMENTS 5,421,925 A * 6/1995 Kulaszewicz et al. ...... 156/73.5
6,686,052 B2 * 2/2004 Jogan et al. ............... 428/472.2
2002/0092787 A1 * 7/2002 Cheng ..................... 206/459.5

FOREIGN PATENT DOCUMENTS

JP      3043604     3/2000

* cited by examiner

*Primary Examiner*—James Sells
(74) *Attorney, Agent, or Firm*—W. Norman Roth

(57) ABSTRACT

Provided is a welded processed product which is reduced in the hear deformation thereof and can exhibit improved the welding strength between component processed articles. A welded processed products, wherein a first convex column (13) and second convex columns (14A and 14B) to be subjected to the vibration-welding with a joining surface (11a) of a first processed article (11) with each other are provided on a joining surface (12a) of a second processed article (12). When or after the above first and second convex columns (13) and the second convex columns (14A and 14B) and the joining surface 11a of the first processed article 11 are vibration-welded together by use of a vibration welding machine, a cooling fluid from a cooling fluid source 26 is supplied to a region surrounded by the first convex column 13 via a supply port 15 and discharged therefrom via a discharge port 16 so as to effect cooling in the region.

3 Claims, 4 Drawing Sheets

METHOD FOR WELDING PROCESSED ARTICLE AND WELDED PROCESSED PRODUCT

TECHNICAL FIELD

The present invention relates to a method for welding processed articles and welded processed product formed of thermoplastic materials by means of friction heat which is generated by mutually vibrating the articles along the surface direction in a state in which the articles are in surface contact, and to a welded processed product. In particular, the term referred to as a processed article in the description of this application specifically refers to a welded part formed of thermoplastic materials.

BACKGROUND ART

In a vehicle such as an automobile, an airbag apparatus is attached to the inner side of an interior panel covering a portion in front of the front passenger seat or driver's seat thereof. Such an airbag apparatus includes an inflator which is operated in response to an impact at the time of, for example, collision of the vehicle, so as to rapidly inflate and deploy an airbag. By means of pressure generated at the time of inflation and deployment, a fracture opening portion provided on the interior panel is ruptured, and at the same time, the airbag is caused to inflate and deploy toward the outside of the panel through an opening formed as a result of the rupture to thereby protect a passenger sitting in the front passenger seat, or the like, from the impact caused by the collision.

A reinforcement member formed of the same thermoplastic resin material as that of the interior panel is welded to the inner side of the interior panel where such an airbag apparatus is attached; in particular, to the reverse surface of the fracture opening portion of the interior panel. Thus, the reinforcement member prevents the fracture opening portion from concavely deforming or fracturing upon receipt of an impact applied from the outside of the interior panel. In addition, when the fracture opening portion is rupture-opened because of inflation and deployment of the airbag, the reinforcement member prevents the fracture opening portion from separating from the interior panel and scattering. A vibration welding machine is used for such welding between an interior panel and a reinforcement member (see, for example, Patent Document 1).

Patent Document 1: Japanese Patent No. 3043604

DISCLOSURE OF THE INVENTION

Problems to be Solved by the Invention

Incidentally, articles, such as an interior panel and a reinforcement member, which are welded together by means of a vibration welding machine, are molded from a thermoplastic resin material. Joining surfaces of parts to be vibration-welded together are configured such that both joining surfaces are flat, or such that one surface is flat and the other surface is uneven.

When such processed articles are vibration-welded together, both the articles are set on a vibration welding machine, the joining surfaces of the articles are brought into contact with each other, and the articles are vibrated in relation to each other along the extending direction (surface direction) of the joining surfaces, while pressure is applied to the articles. Thus, contacting portions of the articles are melted and joined together by means of friction heat.

However, in such a conventional welded processed product, when a period of time during which vibration friction acts on the articles is increased so as to secure sufficient welding strength between the articles, melting heat is transmitted from the joining portions to portions adjacent to the joining portions, so that those portions thermally deform. In particular, in the case of a article, such as a decorative panel used for an interior panel of an automobile or the like, which has a layered structure composed of a hard polypropylene substrate, a polypropylene-foam intermediate layer, and a thermoplastic polyolefin layer covering the polypropylene-foam intermediate layer, the polypropylene-foam intermediate layer or the thermoplastic polyolefin layer is softened or melted due to the melting heat at the joining portions. As a result, the decorative panel has a deformation such as a concavity or convexity on its surface, and thus, the quality of the product deteriorates. Further, when the period of time during which vibration friction acts on the articles is shortened so as to avoid thermal deformation of the product, the welding strength between the articles decreases, and the welded portions become likely to separate from each other.

The present invention has been accomplished so as to solve the above-mentioned problems in the conventional technique, and an object of the present invention is to provide a processed article welding method which can significantly reduce thermal deformation of a: product and can increase the welding strength between articles, and a welded processed product produced by use of the method.

In order to achieve the above object, the present invention provides a processed article welding method comprising the steps of providing first and second processed articles having joining surfaces to be vibration-welded together, one of the first and second processed articles including a first convex column surrounding the joining surface thereof and a plurality of second convex columns formed in a region surrounded by the first convex column, wherein the first and second processed articles include a supply port and a discharge port for a cooling fluid for effecting cooling in the region; placing the first and second processed articles on a vibration welding machine in such a manner that the first and second convex columns are superposed under pressure on the joining surface of the other of the first and second processed articles; activating the vibration welding machine so as to vibrate the first and second processed articles to thereby weld the first and second convex columns to the joining surface of the other of the first and second processed articles; and supplying the cooling fluid from a cooling fluid source to the region surrounded by the first convex column via the supply port and discharging the cooling fluid via the discharge port so as to effect cooling in the region during the vibration welding or after completion of the vibration welding.

A welded processed product according to the present invention includes first and second processed articles each formed of a thermoplastic material, wherein the first and second processed articles have joining surfaces to be vibration-welded together; one of the first and second processed articles includes a first convex column which surrounds the joining surface thereof and which is to be vibration-welded to the joining surface of the other of the first and second processed articles, and a plurality of second convex columns which are formed in a region surrounded by the first convex column and which are to be vibration-welded to the joining surface of the other of the first and second processed articles; and a supply port and a discharge port for a cooling fluid for effecting cooling in the region are provided at least on one of the joining surfaces of the first and second processed articles.

EFFECTS OF THE INVENTION

According to the welding method and the welded processed product of the present invention, when or after first and second convex columns provided on a joining surface of one of first and second processed articles and a joining surface of the other of the first and second processed articles are melted and joined together by means of vibration welding, a cooling fluid from a cooling fluid source is supplied to a region surrounded by the first convex column via a supply port and discharged therefrom via a discharge port so as to effect cooling in the region. Therefore, portions, other than joining portions welded together, are prevented from reaching the melting temperature. Thus, thermal deformation of products can be greatly reduced, and the welding strength between the articles can be improved.

BEST MODE FOR CARRYING OUT THE INVENTION

A processed article welding method and a welded processed product according to embodiments are characterized in that when or after first and second convex columns provided on a joining surface of one of first and second processed articles and a joining surface of the other of the first and second processed articles are welded together by means of vibration welding, a cooling fluid from a cooling fluid source is supplied to a region surrounded by the first convex column via a supply port and discharged therefrom via a discharge port so as to effect cooling in the region, to thereby prevent portions, other than joining portions welded together, from being heated to the melting temperature.

This configuration greatly reduces thermal deformation of a yielded product and increases the welding strength between the articles.

First Embodiment

Next, a first embodiment of the present invention will be described with reference to the drawings.

FIG. 1 is a vertically sectioned side view of a portion of a welded processed product according to the first embodiment of the present invention. FIG. 2 is a plan view of the welded processed product taken along line 2-2 of FIG. 1. FIG. 3 is a view schematically showing the structure of a vibration welding machine for welding processed articles used in the first embodiment. FIG. 4 is a set of explanatory sectional views showing a process of welding the processed articles in the first embodiment.

In FIG. 1, a welded processed product 10 includes a first processed article (a molded part) 11, and a second processed article (a molded-part) 12 fixed to the reverse surface of the first processed article 11 by means of vibration welding. The first processed article 11 is a synthetic-resin interior panel of a vehicle or the like, which is molded from a thermoplastic resin, such as polypropylene resin, as a main material. The second processed article 12 is a panel reinforcement member or the like, which is formed (or molded) by use of a thermoplastic resin, such as an olefin-based elastomer or a urethane-based elastomer.

The first processed article 11 has a joining surface 11a of a predetermined area on the reverse surface thereof. The second processed article 12 has a joining surface 12a of a predetermined area corresponding to the joining surface 11a of the first processed article 11.

As shown in FIGS. 1 and 2, a first convex column 13 (having a height of about 0.5 to 1.0 mm) to be vibration-welded to the joining surface 11a of the first processed article 11 is formed on the joining surface 12a of the second processed article 12 such that the first convex column 13 surrounds the joining surface 12a and assumes the form of a rectangular frame.

As shown in FIG. 2, within a region surrounded by the first convex column 13, a plurality of second convex columns 14A (having a height of about 0.5 to 1.0 mm), which extend from a first longer side 13a of the first convex column 13 toward a second longer side 13b thereof and a plurality of second convex columns 14B (having a height of about 0.5 to 1.0 mm), which extend from the second longer side 13b of the first convex column 13 toward the first longer side 13a thereof are alternately provided at uniform intervals along the direction of the longer sides. Further, a supply port 15 for a cooling fluid, such as compressed air, for cooling the interior of the region is formed at the center of the region surrounded by the first convex column 13, and discharge ports 16 for the cooling fluid are formed in the first convex column 13 at positions near the corresponding diagonal corners of the region. The first convex column 13 and the second convex columns 14A and 14B form a cooling-fluid flow passage 17 meandering in the above-mentioned region. The passage 17 communicates with the supply port 15 and the discharge ports 16. The second convex columns 14A and 14B are vibration-welded to the joining surface 11a of the first processed article 11.

Next, the structure of a vibration welding machine shown FIG. 3 will be described.

As shown in FIG. 3, a vibration welding machine 20 includes pressing means 21, a pressing table 22, a pressing jig 23, a welding jig 24, vibration generation means 25, a cooling-fluid source 26, etc.

The pressing means 21 supports the pressing table 22 to be movable in the vertical direction. The pressing means 21 applies to the pressing table 22 a predetermined pressure required for welding when the vibration welding machine 20 performs welding operation.

The pressing jig 23 is replaceably mounted to the upper surface of the pressing table 22. The pressing jig 23 supports one of processed articles to be welded together. In the illustrated example, the first processed article 11 is placed on the upper surface of the pressing jig 23.

The welding jig 24 supports the other of the processed articles to be welded together. In the illustrated example, the second processed article 12 is attached to the lower surface of the welding jig 24. Further, the welding jig 24 is coupled with the vibration generation means 25 disposed above the pressing table 22.

The vibration generation means 25 imparts to the welding jig 24 vibrations for welding. As shown in FIG. 3, the vibration generation means 25 includes a vibration generation section 251, a vibration body 252 formed of plate springs or the like and vibrated in a horizontal direction by means of the vibration generation section 251, and a support plate 253 provided on the lower surface of the vibration body 252. The welding jig 24 is replaceably attached to the lower surface of the support plate 253.

The cooling-fluid source 26 supplies a cooling fluid to the welded portions of the first processed article 11 and the second processed article 12. A fluid supply hose 261 of the cooling-fluid source 26 is connected to the welding jig 24 so as to supply the cooling fluid from the cooling-fluid source 26 to the supply port 15 of the second processed article 12 via a passage 241 formed in the welding jig 24.

Next, operation for joining the first processed article 11 and the second processed article 12 by means of vibration welding will be described.

First, the first processed article 11 is set on the pressing jig 23, and the second processed article 12 is set on the welding jig 24. Subsequently, the pressing means 21 is operated so as to raise the pressing table 22 to thereby move the pressing jig 23 toward the welding jig 24. As a result, as shown in FIG. 4(A), the joining surface 11a of the first processed article 11 is brought into contact with the first convex column 13 and the second convex columns 14A and 14B of the second processed article 12, and the pressed state is maintained by means of the pressing means 21. In this state, the cooling fluid; e.g., compressed cooling air, from the cooling-fluid source 26 is caused to flow into the region surrounded by the first convex column 13 via the fluid supply hose 216, the passage 241, and the supply port 15 of the second processed article 12. The cooling air having flowed into the region flows through the passage 17 as indicated by arrows A, and flows to the outside of the region via the discharge ports 16. Thus, cooling is effected in the region. Simultaneously, the vibration generation section 251 of the vibration generation means 25 is started so as to vibrate the vibration body 252 in the horizontal direction in FIG. 3 so that friction is produced between the pressure-contacted joining surface 11a of the first processed article 11 and the press-contacted surfaces of the first convex column 13 and the second convex columns 14A and 14B of the second processed article 12. As a result, because of friction heat, the pressure-contacted surface of the first processed article 11 and those of the first convex column 13 and the second convex columns 14A and 14B are melted and joined together as shown in FIG. 4(B). At this time, since the region surrounded by the first convex column 13 is cooled by the cooling air, portions, other than the actually welded joining portions, are prevented from reaching the melting temperature.

According to the welded processed product and the welding method of the present embodiment, the first convex column 13 and the second convex columns 14A and 14B to be vibration-welded to the joining surface 11a of the first processed article 11 are provided on the joining surface 12a of the second processed article 12; and when the first convex column 13 and the second convex columns 14A and 14B and the joining surface 11a of the first processed article 11 are vibration-welded together by use of the vibration welding machine, the cooling fluid from the cooling-fluid source 26 is supplied to the region surrounded by the first convex column 13 via the supply port 15 and discharged therefrom via the discharge ports 16, whereby cooling is effected in the region. Therefore, portions, other than the actually welded joining portions between the first convex column 13 and the second convex columns 14A and 14B and the joining surface 11a of the first processed article 11 welded together, are prevented from reaching the melting temperature. Accordingly, even when the period of time during which vibration friction acts on the articles is increased, the possibility of the first processed article 11 or the like being thermally deformed because of melting heat can be reduced significantly, and the quality of products does not deteriorate. In addition, a welding strength required to join the articles together can be secured, and partial separation of the welded portions can be prevented.

Accordingly, even in the case where the welded processed product is a article, such as a decorative panel used for an interior panel of an automobile or the like, which has a layered structure composed of a hard polypropylene substrate, a polypropylene-foam intermediate layer, and a thermoplastic polyolefin layer covering the polypropylene-foam intermediate layer, the polypropylene-foam intermediate layer and the thermoplastic polyolefin layer are neither softened nor melted due to the melting heat at the joining portions. As a result, deformation, such as a concavity or convexity, is not produced on the surface of the product.

Second Embodiment

A second embodiment of a welded processed product according to the present invention will be described with reference to FIG. 5.

FIG. 5 is a vertically sectioned side view of a portion of a welded processed product according to the present invention. In FIG. 5, constituent elements identical with those of FIG. 1 are denoted by like symbols, and their descriptions are not repeated, and only portions different from those of FIG. 1 will be mainly described.

As is apparent from FIG. 5, the second embodiment differs from the first embodiment shown in FIG. 1 in that fine recesses and projections 11b (e.g., satin-like fine recesses and projections, or grains) for increasing frictional resistance are formed on the joining surface 11a of the first processed article 11 to which the first convex column 13 and the second convex columns 14A and 14B of the second processed article 12 are to be welded.

According the second embodiment, fine recesses and projections 11b for increasing frictional resistance are formed on the joining surface 11a of the first processed article 11 to which the first convex column 13 and the second convex columns 14A and 14B are to be welded. Therefore, the vibration-welding-time required to weld the articles can be shortened, and welding of the articles can be reliably performed.

In the above-described first embodiment, the first convex column 13 and the second convex columns 14A and 14B are formed on the joining surface 12a of the second processed article 12. However, the present invention is not limited thereto, and the first convex column 13 and the second convex columns 14A and 14B may be formed on the joining surface 11a of the first processed article 11.

The fine recesses and projections 11b for increasing frictional resistance may be formed on the first convex column 13 and the second convex columns 14A and 14B of the second processed article 12 rather than on the joining surface 11a of the first processed article 11.

The pattern of the first convex column 13 and the second convex columns 14A and 14B formed on the joining surface 12a of the second processed article 12 (or the joining surface 11a of the first processed article 11) is not limited to that shown in FIG. 2. For example, a second convex column may be spirally formed in the region surrounded by the first convex column 13. Alternatively, straight second convex columns are provided in the region surrounded by the first convex column 13 such that the second convex columns radially extend from the supply port 15 to reach the first convex column 13, and the discharge port 16 is provided in each region sandwiched by adjacent second convex columns. Moreover, the number of the supply port 15 and discharge ports 16 for cooling fluid for effecting cooling in the region surrounded by the first convex column 13 is not limited to one or two as in the first embodiment, but may be more than two.

As in the case of an interior panel of an automobile or the like, of the first processed article 11 and the second processed article 12, the second processed article 12 disposed inside the first processed article (interior panel) may be molded by use of a semi-transparent thermoplastic resin material. In this case, the state of welding between the first and second processed articles can be viewed from the outside.

The present invention is not limited to the above-described embodiments, and may be practiced in various forms in terms of specific structure, function, action, and effect, without departing from the scope of the invention.

The lid of the airbag apparatus may be formed by use of the first processed article 11 and the second processed article 12.

The timing of cooling of the first and second processed articles is not limited to the period in which vibration welding is being performed, and may be after completion of the vibration welding.

Figure 1:
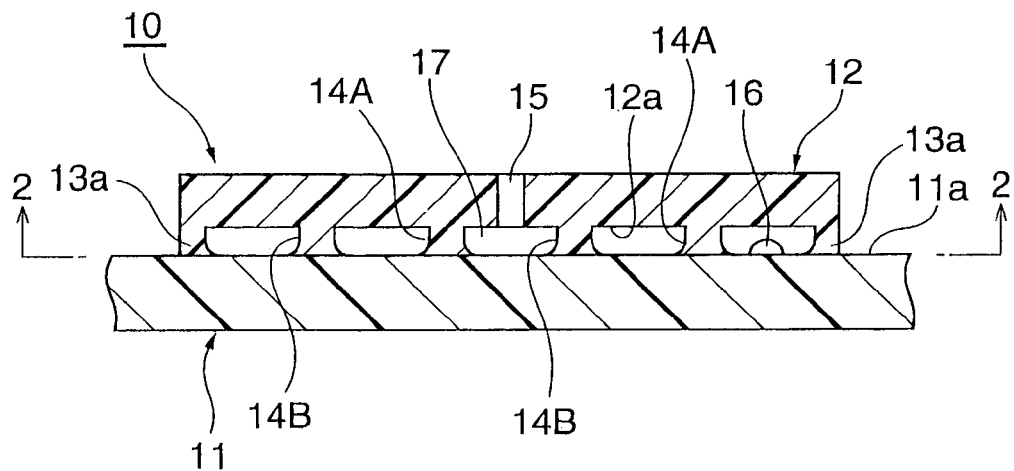
FIG. 1 is a vertically sectioned side view of a portion of a welded processed product according to the first embodiment of the present invention.
Figure 2:
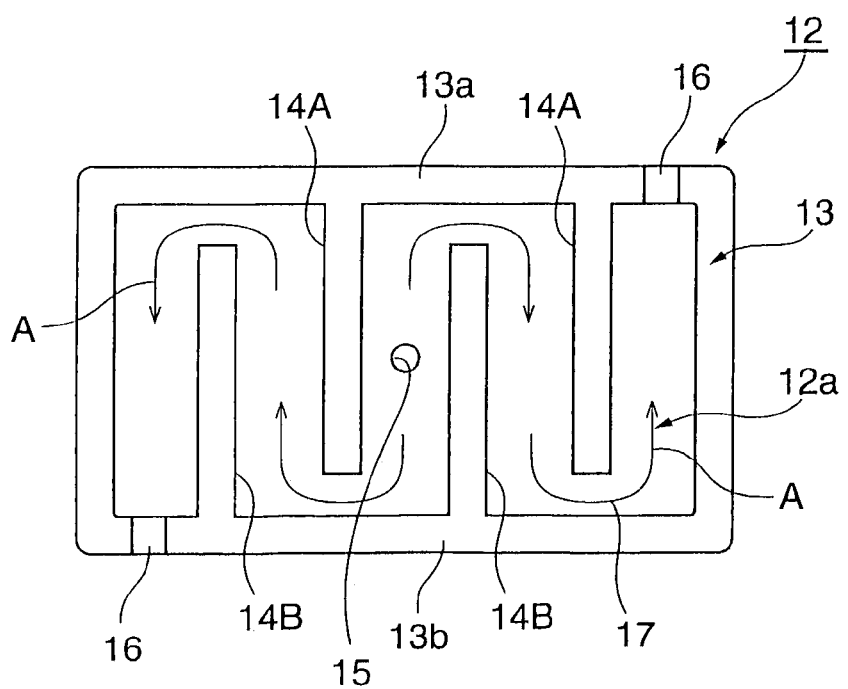
FIG. 2 is a plan view of the welded processed product taken along line 2-2 of FIG. 1.
Figure 3:
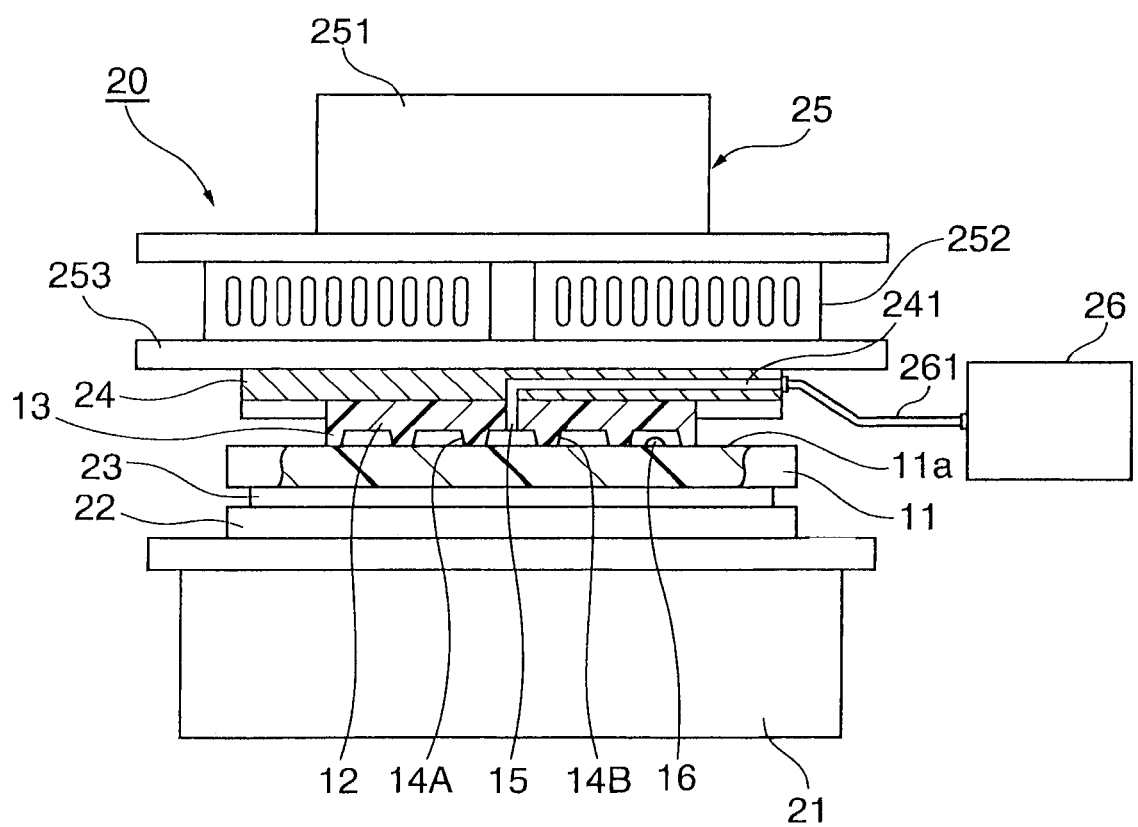
FIG. 3 is a view schematically showing the structure of a vibration welding machine for welding processed articles used in the first embodiment.
Figure 4A:
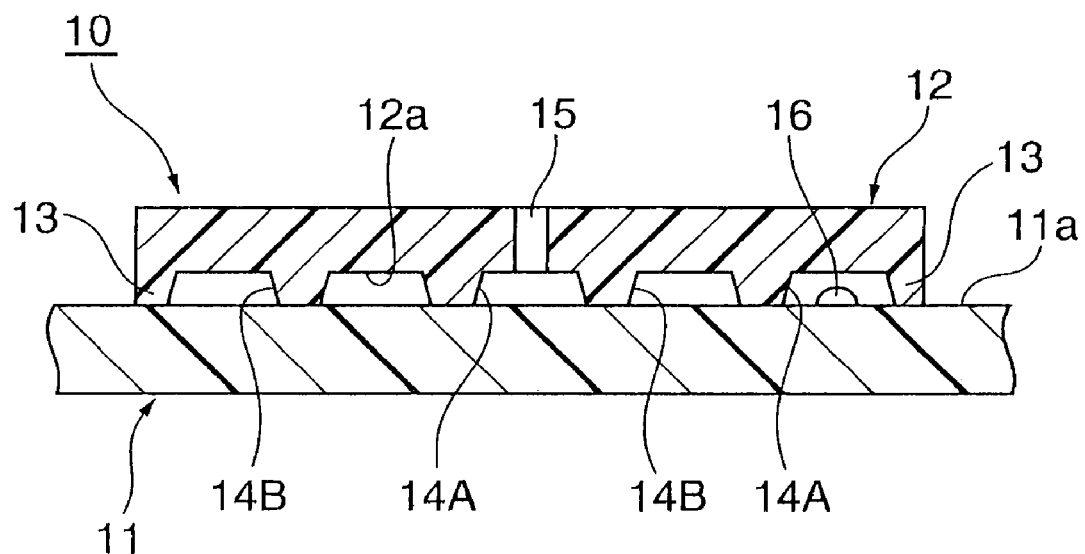
FIG. 4 is a set of explanatory sectional views showing a process of welding the processed articles in the first embodiment.
Figure 4B:
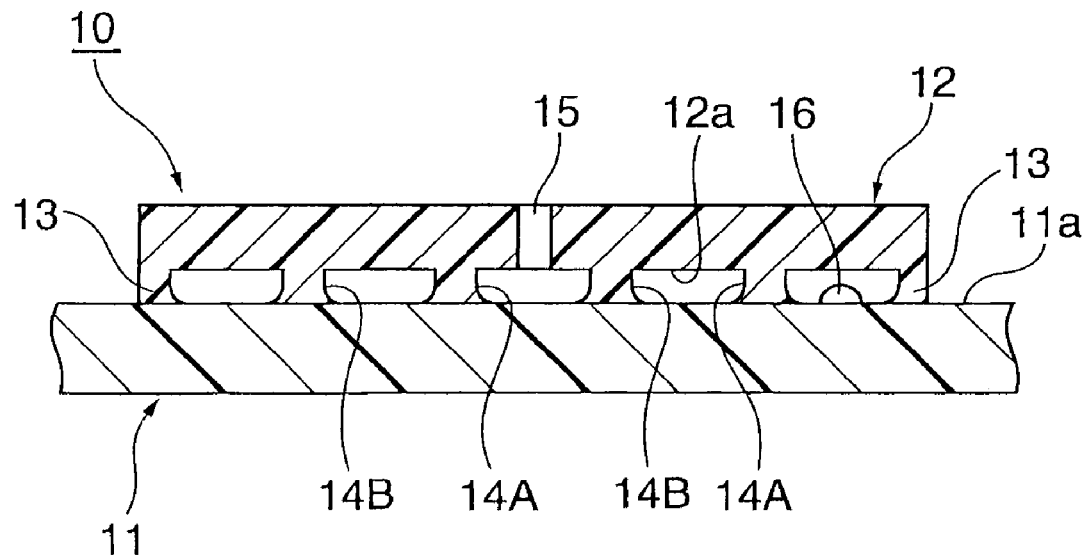
Figure 5:
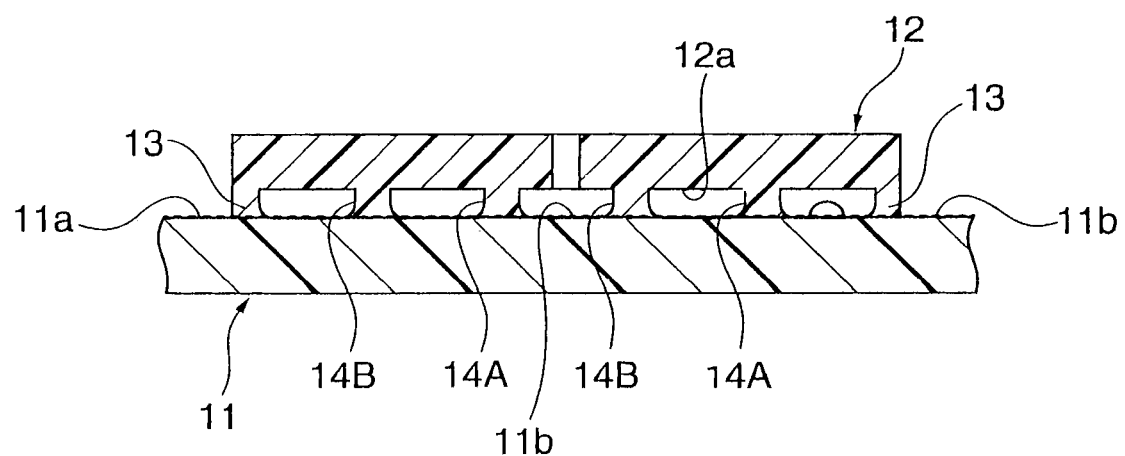
FIG. 5 is a vertically sectioned side view of a portion of a welded processed product according to the second embodiment of the present invention.

The invention claimed is:

1. A method for welding thermoplastic articles characterized by comprising the steps of:
providing first and second thermoplastic articles having joining surfaces to be vibration-welded together, one of the first and second thermoplastic articles including a first convex column surrounding the joining surface thereof and a plurality of second convex columns formed in a region surrounded by the first convex column, wherein the first and second thermoplastic articles include a supply port and a discharge port for a cooling fluid for effecting cooling in the region;

placing the first and second thermoplastic articles on a vibration welding machine in such a manner that the first and second convex columns are superposed under pressure on the joining surface of the other of the first and second thermoplastic articles;

activating the vibration welding machine so as to vibrate the first and second thermoplastic articles to thereby weld the first and second convex columns to the joining surface of the other of the first and second thermoplastic articles; and supplying the cooling fluid from a cooling fluid source to the region surrounded by the first convex column via the supply port and discharging the cooling fluid via the discharge port so as to effect cooling in the region during the vibration welding.

2. A method for welding thermoplastic articles according to claim 1, wherein fine recesses and projections for increasing frictional resistance are formed at least on the joining surface of the other of the first and second thermoplastic articles or on surfaces of the first and second convex columns which come into contact with that joining surface.

3. A method for welding thermoplastic articles according to claim 1, wherein at least one of the first and second thermoplastic articles is formed of a semi-transparen tmaterial.

* * * * *